(12) United States Patent
Jakóbczyk et al.

(10) Patent No.: US 12,349,741 B2
(45) Date of Patent: Jul. 8, 2025

(54) AEROSOL PROVISION DEVICE

(71) Applicant: eSmoking Institute Sp. z o.o., Poznan (PL)

(72) Inventors: Adrian Jakóbczyk, Poznan (PL); Lukasz Milewski, Poznan (PL); Marcin Kozlowski, Poznan (PL); Marcin Kos, Poznan (PL); Andrzej Szykowny, Poznan (PL); Krzysztof Szeinig, Poznan (PL); Maciej Maciagowski, Poznan (PL); Pawel Zielazek, Poznan (PL)

(73) Assignee: eSmoking Institute Sp. z o.o., Poznan (PL)

( * ) Notice: Subject to any disclaimer, the term of this patent is extended or adjusted under 35 U.S.C. 154(b) by 378 days.

(21) Appl. No.: 18/001,399

(22) PCT Filed: Jun. 9, 2021

(86) PCT No.: PCT/EP2021/065445
§ 371 (c)(1),
(2) Date: Dec. 9, 2022

(87) PCT Pub. No.: WO2021/250088
PCT Pub. Date: Dec. 16, 2021

(65) Prior Publication Data
US 2023/0218013 A1    Jul. 13, 2023

(30) Foreign Application Priority Data
Jun. 10, 2020    (PL) .......................................... 434277

(51) Int. Cl.
*A24F 40/90*    (2020.01)
*A24F 40/20*    (2020.01)
(Continued)

(52) U.S. Cl.
CPC .............. *A24F 40/90* (2020.01); *A24F 40/20* (2020.01); *A24F 40/53* (2020.01); *H01M 10/44* (2013.01);
(Continued)

(58) Field of Classification Search
CPC ....... Y02E 60/10; H02J 7/0071; H02J 7/0048; H02J 7/0068; H02J 7/00712;
(Continued)

(56) References Cited

U.S. PATENT DOCUMENTS 10,136,674 B2 * 11/2018 Murison ................ A24F 15/015
10,588,176 B2 * 3/2020 Marsh ..................... A24F 40/46
(Continued)

FOREIGN PATENT DOCUMENTS

JP    2012104995 A    5/2012
JP    2015500647 A    1/2015
(Continued)

OTHER PUBLICATIONS

International Search Report and Written Opinion of corresponding International Application No. PCT/EP2021/065445 mailed Aug. 20, 2021, all pages cited in its entirety.
(Continued)

*Primary Examiner* — Jean F Duverne
(74) *Attorney, Agent, or Firm* — Burr & Forman LLP

(57) ABSTRACT

An apparatus and a method for an aerosol generating device is described, the apparatus including a control module and a charging controller. The charging controller is configured to control charging of a battery at a first charging rate in a first charging mode and to control charging of the battery at a second charging rate, lower than the first charging rate, in a second charging mode. The control module is configured to determine whether the aerosol generating device is in use. The charging controller, when operating in the second
(Continued)

charging mode, is configured to change the charging mode to the first charging mode in the event that the control module determines that the aerosol generating device is in use.

21 Claims, 8 Drawing Sheets

(51) Int. Cl.
*A24F 40/53* (2020.01)
*H01M 10/44* (2006.01)
*H02J 7/00* (2006.01)
(52) U.S. Cl.
CPC .......... *H02J 7/0048* (2020.01); *H02J 7/0068* (2013.01); *H02J 7/00712* (2020.01); *H01M 2220/30* (2013.01); *H02J 2310/22* (2020.01)
(58) Field of Classification Search
CPC ....... H02J 2310/22; A24F 40/50; A24F 40/60; A24F 40/90; A24F 40/20; A24F 40/53; H01M 10/44; H01M 2220/30
See application file for complete search history.

(56) References Cited

U.S. PATENT DOCUMENTS 11,085,550 B2 * 8/2021 Marsh .................. H02J 7/0044
2015/0333542 A1 11/2015 Alarcon et al.

FOREIGN PATENT DOCUMENTS

| KR | 100585763 B1 | 6/2006 |
| KR | 1020190086765 A | 7/2019 |
| WO | 2017118553 A1 | 7/2017 |
| WO | 2020035899 A1 | 2/2020 |

OTHER PUBLICATIONS

Notice of Reasons for Rejection from corresponding Japanese Application No. 2022-574487 mailed Feb. 6, 2024, all pages cited in its entirety.
Office Action issued in corresponding Korean Patent Application No. 10-2022-7043361 mailed Feb. 18, 2025, all pages cited in its entirety.

* cited by examiner

AEROSOL PROVISION DEVICE

CROSS-REFERENCE TO RELATED APPLICATIONS

The present application is a National Phase entry of PCT Application No. PCT/EP2021/065445, filed Jun. 9, 2021, which claims priority from Poland Application No. P.434277, filed Jun. 10, 2020, each of which is hereby fully incorporated herein by reference.

TECHNICAL FIELD

The present specification relates to an aerosol provision device and a method of using such a device.

BACKGROUND

Smoking articles, such as cigarettes, cigars and the like burn tobacco during use to create tobacco smoke. Attempts have been made to provide alternatives to these articles by creating products that release compounds without combusting. For example, tobacco heating devices heat an aerosol generating substrate such as tobacco to form an aerosol by heating, but not burning, the substrate.

SUMMARY

In a first aspect, this specification describes an apparatus for an aerosol generating device, the apparatus comprising a control module and a charging controller, wherein: the charging controller is configured to control charging of a battery at a first charging rate in a first charging mode and to control charging of the battery at a second charging rate, lower than the first charging rate, in a second charging mode; and the control module is configured to determine whether the aerosol generating device is in use, wherein the charging controller, when operating in the second charging mode, is configured to change the charging mode to the first charging mode in the event that the control module determines that the aerosol generating device is in use. The control module may form part of the charging controller.

The apparatus may further comprise the battery. Alternatively, or in addition, the apparatus may further comprise an aerosol generator.

Some embodiments further comprise a user interface. The user interface may enable a user to provide information, for example relating to the usage of the aerosol generating device and/or the power capabilities of the aerosol generating device.

The control module may be configured to determine information relating to usage of the aerosol generating device and the charging controller may be configured to operate in a charging mode dependent, at least in part, on the usage of the aerosol generating device.

The charging controller may be configured to control charging of the battery using a power supply at a charging current dependent, at least in part, on power capabilities of the power supply.

The charging controller may be configured to operate in a charging mode dependent, at least in part, on a charge level of the aerosol generating device.

The charging controller may be configured to disable charging of the battery in the event that a charge level of the battery is above a battery charge threshold.

In a second aspect, this specification describes a method comprising: determining whether a charging controller of an aerosol generating device is operating in a first charging mode or a second charging mode, wherein a charging rate is set to a first charging rate in the first charging mode and a second charging rate, lower than the first charging rate, in the second charging mode; determining whether the aerosol generating device is in use; and changing the charging mode from the second charging mode to the first charging mode in the event that the charging controller is determined to be operating in the second charging mode and the aerosol generating device is determined to be in use. The method may further comprise charging said battery.

The method may further comprise obtaining or determining information relating to usage of the aerosol generating device and selecting the charging mode dependent, at least in part, on the usage of the aerosol generating device.

The method may further comprise selecting the charging mode dependent, at least in part, on power capabilities of a power supply used for charging the battery.

The method may further comprise obtaining or determining information relating to a charge level of the aerosol generating device and selecting the charging mode dependent, at least in part, on the charge level of the aerosol generating device.

The method may further comprise disabling charging of the battery in the event that a charge level of the battery is above a battery charge threshold.

In a third aspect, this specification describes a non-combustible aerosol generating device comprising an apparatus (e.g. a tobacco heating system) including any of the features of the first aspect. The aerosol generating device may be configured to receive a removable article comprising an aerosol generating material. The aerosol generating material may comprise an aerosol generating substrate and an aerosol forming material.

In a fourth aspect, this specification describes an aerosol provision system for generating aerosol from an aerosolizable material, the aerosol provision system comprising an apparatus including any of the features of the first aspect described above or a device including any of the features of the third aspect described above.

In a fifth aspect, this specification describes computer-readable instructions which, when executed by computing apparatus, cause the computing apparatus to perform any method as described with reference to the second aspect.

In a sixth aspect, this specification describes a kit of parts comprising an article (e.g. a removable article comprising an aerosol generating material) for use in a non-combustible aerosol generating system, wherein the non-combustible aerosol generating system comprises an apparatus including any of the features of the first aspect described above or a device or system including any of the features of the third or fourth aspects described above.

BRIEF DESCRIPTION OF THE DRAWINGS

Example embodiments will now be described, by way of example only, with reference to the following schematic drawings, in which.

DETAILED DESCRIPTION OF THE DRAWINGS

Figure 1:
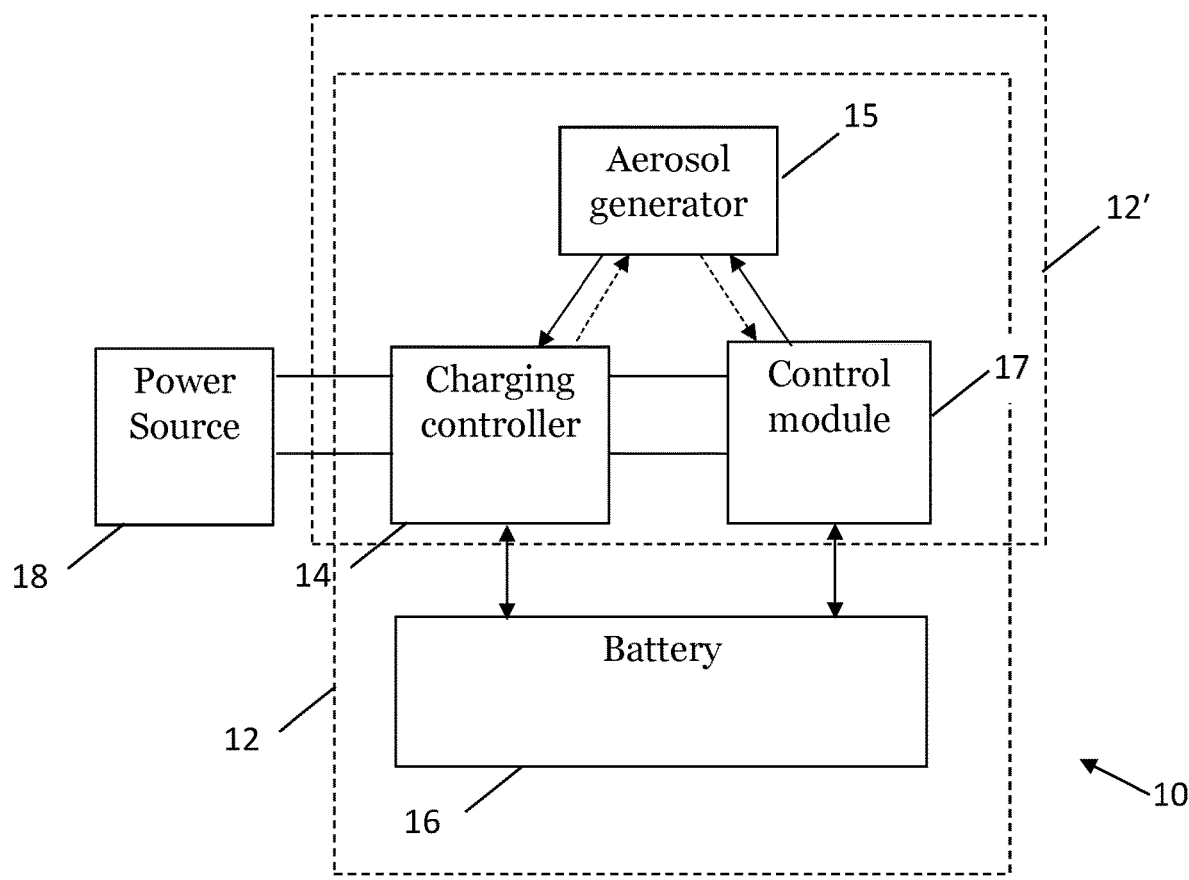
FIG. 1 is a block diagram of a system in accordance with an example embodiment.

As used herein, the term "delivery system" is intended to encompass systems that deliver a substance to a user, and includes:
  combustible aerosol provision systems, such as cigarettes, cigarillos, cigars, and tobacco for pipes or for roll-your-own or for make-your-own cigarettes (whether based on tobacco, tobacco derivatives, expanded tobacco, reconstituted tobacco, tobacco substitutes or other smokable material);
  non-combustible aerosol provision systems that release compounds from an aerosolizable material without combusting the aerosolizable material, such as electronic cigarettes, tobacco heating products, and hybrid systems to generate aerosol using a combination of aerosolizable materials;
  articles comprising aerosolizable material and configured to be used in one of these non-combustible aerosol provision systems; and
  aerosol-free delivery systems, such as lozenges, gums, patches, articles comprising inhalable powders, and smokeless tobacco products such as snus and snuff, which deliver a material to a user without forming an aerosol, wherein the material may or may not comprise nicotine.

According to the present disclosure, a "combustible" aerosol provision system is one where a constituent aerosolizable material of the aerosol provision system (or component thereof) is combusted or burned in order to facilitate delivery to a user.

According to the present disclosure, a "non-combustible" aerosol provision system is one where a constituent aerosolizable material of the aerosol provision system (or component thereof) is not combusted or burned in order to facilitate delivery to a user.

In embodiments described herein, the delivery system is a non-combustible aerosol provision system, such as a powered non-combustible aerosol provision system.

In one embodiment, the non-combustible aerosol provision system is an electronic cigarette, also known as a vaping device or electronic nicotine delivery system (END), although it is noted that the presence of nicotine in the aerosolizable material is not a requirement.

In one embodiment, the non-combustible aerosol provision system is a tobacco heating system, also known as a heat-not-burn system.

In one embodiment, the non-combustible aerosol provision system is a hybrid system to generate aerosol using a combination of aerosolizable materials, one or a plurality of which may be heated. Each of the aerosolizable materials may be, for example, in the form of a solid, liquid or gel and may or may not contain nicotine. In one embodiment, the hybrid system comprises a liquid or gel aerosolizable material and a solid aerosolizable material. The solid aerosolizable material may comprise, for example, tobacco or a non-tobacco product.

Typically, the non-combustible aerosol provision system may comprise a non-combustible aerosol provision device and an article for use with the non-combustible aerosol provision system. However, it is envisaged that articles which themselves comprise a means for powering an aerosol generating component may themselves form the non-combustible aerosol provision system.

In one embodiment, the non-combustible aerosol provision device may comprise a power source and a controller. The power source may be an electric power source or an exothermic power source. In one embodiment, the exothermic power source comprises a carbon substrate which may be energized so as to distribute power in the form of heat to an aerosolizable material or heat transfer material in proximity to the exothermic power source. In one embodiment, the power source, such as an exothermic power source, is provided in the article so as to form the non-combustible aerosol provision.

In one embodiment, the article for use with the non-combustible aerosol provision device may comprise an aerosolizable material, an aerosol generating component, an aerosol generating area, a mouthpiece, and/or an area for receiving aerosolizable material.

In one embodiment, the aerosol generating component is a heater capable of interacting with the aerosolizable material so as to release one or more volatiles from the aerosolizable material to form an aerosol. In one embodiment, the aerosol generating component is capable of generating an aerosol from the aerosolizable material without heating. For example, the aerosol generating component may be capable of generating an aerosol from the aerosolizable material without applying heat thereto, for example via one or more of vibrational, mechanical, pressurization, or electrostatic means.

In one embodiment, the aerosolizable material may comprise an active material, an aerosol forming material and optionally one or more functional materials. The active material may comprise nicotine (optionally contained in tobacco or a tobacco derivative) or one or more other non-olfactory physiologically active materials. A non-olfactory physiologically active material is a material which is included in the aerosolizable material in order to achieve a physiological response other than olfactory perception. The active substance as used herein may be a physiologically active material, which is a material intended to achieve or enhance a physiological response. The active substance may for example be selected from nutraceuticals, nootropics, psychoactives. The active substance may be naturally occurring or synthetically obtained. The active substance may comprise for example nicotine, caffeine, taurine, theine, vitamins such as B6 or B12 or C, melatonin, cannabinoids, or constituents, derivatives, or combinations thereof. The active substance may comprise one or more constituents, derivatives or extracts of tobacco, *cannabis* or another botanical. In some embodiments, the active substance comprises nicotine. In some embodiments, the active substance comprises caffeine, melatonin or vitamin B12.

The aerosol forming material may comprise one or more of glycerine, glycerol, propylene glycol, diethylene glycol, triethylene glycol, tetraethylene glycol, 1,3-butylene glycol, erythritol, meso-Erythritol, ethyl vanillate, ethyl laurate, a diethyl suberate, triethyl citrate, triacetin, a diacetin mixture, benzyl benzoate, benzyl phenyl acetate, tributyrin, lauryl acetate, lauric acid, myristic acid, and propylene carbonate.

The one or more functional materials may comprise one or more of flavors, carriers, pH regulators, stabilizers, and/or antioxidants.

In one embodiment, the article for use with the non-combustible aerosol provision device may comprise aerosolizable material or an area for receiving aerosolizable material. In one embodiment, the article for use with the non-combustible aerosol provision device may comprise a mouthpiece. The area for receiving aerosolizable material may be a storage area for storing aerosolizable material. For example, the storage area may be a reservoir. In one embodiment, the area for receiving aerosolizable material may be separate from, or combined with, an aerosol generating area.

Aerosolizable material, which also may be referred to herein as aerosol generating material, is material that is capable of generating aerosol, for example when heated, irradiated or energized in any other way. Aerosolizable material may, for example, be in the form of a solid, liquid or gel which may or may not contain nicotine and/or flavorants. In some embodiments, the aerosolizable material may comprise an "amorphous solid", which may alternatively be referred to as a "monolithic solid" (i.e. non-fibrous). In some embodiments, the amorphous solid may be a dried gel. The amorphous solid is a solid material that may retain some fluid, such as liquid, within it.

The aerosolizable material may be present on a substrate. The substrate may, for example, be or comprise paper, card, paperboard, cardboard, reconstituted aerosolizable material, a plastics material, a ceramic material, a composite material, glass, a metal, or a metal alloy.

A consumable is an article comprising or consisting of aerosol-generating material, part or all of which is intended to be consumed during use by a user. A consumable may comprise one or more other components, such as an aerosol-generating material storage area, an aerosol-generating material transfer component, an aerosol generation area, a housing, a wrapper, a mouthpiece, a filter and/or an aerosol-modifying agent. A consumable may also comprise an aerosol generator, such as a heater, that emits heat to cause the aerosol-generating material to generate aerosol in use. The heater may, for example, comprise combustible material, a material heatable by electrical conduction, or a susceptor.

A susceptor is a material that is heatable by penetration with a varying magnetic field, such as an alternating magnetic field. The susceptor may be an electrically-conductive material, so that penetration thereof with a varying magnetic field causes induction heating of the heating material. The heating material may be magnetic material, so that penetration thereof with a varying magnetic field causes magnetic hysteresis heating of the heating material. The susceptor may be both electrically-conductive and magnetic, so that the susceptor is heatable by both heating mechanisms. The device that is configured to generate the varying magnetic field is referred to as a magnetic field generator, herein.

FIG. 1 is a block diagram of a system, indicated generally by the reference numeral 10, in accordance with an example embodiment.

The system 10 comprises a charging controller 14, an aerosol generator 15, a battery 16, a control module 17 and a power source 18. The charging controller 14, the aerosol generator 15, the battery 16 and the control module 17 may form an aerosol generating device 12. Alternatively, the charging controller 14, the aerosol generator 15 and the control module 17 may form an aerosol generating device 12' having an external battery 16.

As discussed in detail below, the charging controller 14 is configured to charge the battery 16 under the control of the control module 17. For example, the charging controller 14 may charge the battery at a first charging rate (in a first charging mode) or a second charging rate (in a second charging mode). The charging mode may be dependent, at least in part, on a charge level of the battery and/or a usage level of the aerosol generating device.

It should be noted that, in some embodiments, the functionality of the control module 17 is implemented by the charging controller 14. Indeed, the control module 17 may be omitted from some example embodiments.

Figure 2:
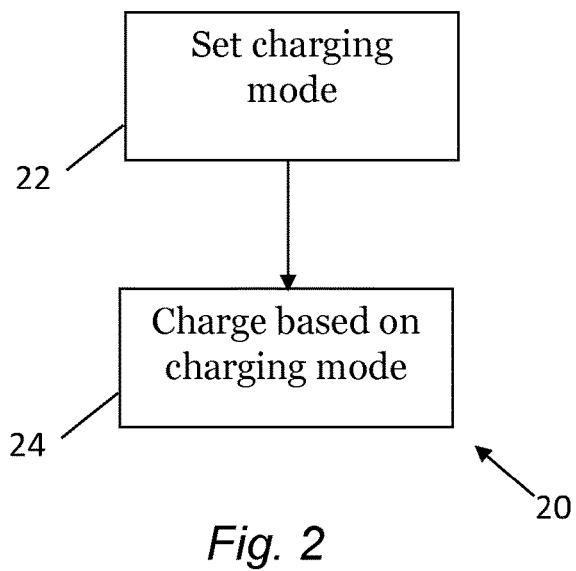
FIGS. 2 and 3 are flow charts showing algorithms in accordance with example embodiments.

FIG. 2 is a flow chart showing an algorithm, indicated generally by the reference numeral 20, in accordance with an example embodiment. The algorithm 20 may be implemented by the system 10 described above.

The algorithm 20 starts at operation 22, where a charging mode is set, for example by the control module 17 or by the charging controller 14. The operation 22 may be implemented by setting a charging mode to a first charging mode (e.g. a higher power charging mode) or a second charging mode (e.g. a lower power charging mode). Thus, the charging rate of charging the battery 16 may be higher in the first charging mode than in the second charging mode. There may be more than two charge levels (and hence more than one threshold) in some example embodiments.

At operation 24, the charging controller 14 controls the charging of the battery 16 based on the charging mode.

Figure 3:
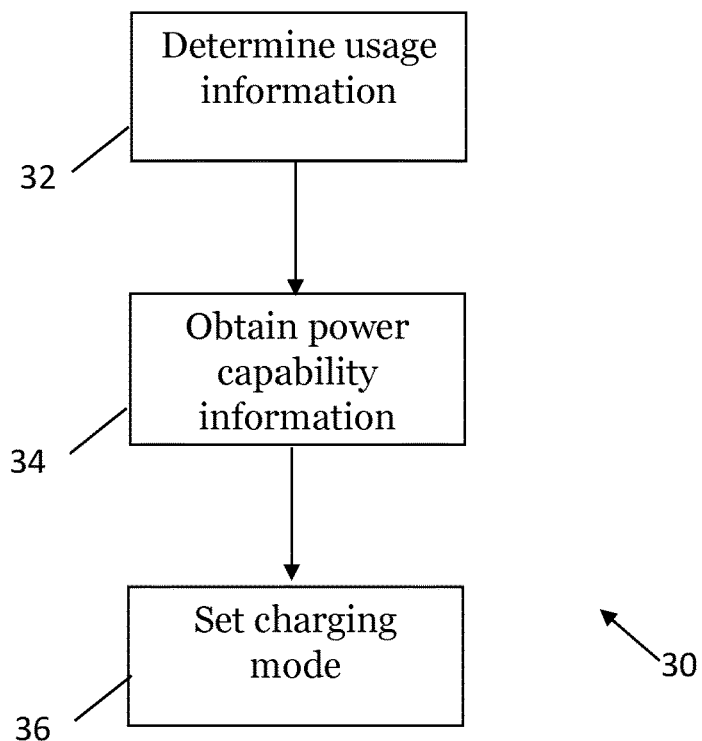

A number of options are possible for setting the charging mode in the operation 22 described above. By way of example, FIG. 3 is a flow chart showing an algorithm, indicated generally by the reference numeral 30, in accordance with an example embodiment. The algorithm 30 may be implemented by the system 10 described above.

The algorithm 30 starts at operation 32, where the charging controller 14 (or the control module 17) determines or obtains usage information of the device 12 or 12'. The usage information may relate to usage of the aerosol generator and/or to charging of the battery 16, as discussed further below.

At operation 34, the charging controller 14 (or the control module 17) determines or obtains power capability information relating to the power source 18. The power capability information may include one or more of the ability of the power source to provide current to implement a particular charging mode, the ability of the power supply to provide a particular charging current, a maximum current and/or a maximum voltage that the power source can provide or a temperature of the power source.

At operation 36, the charging mode is set based on the usage information determined or obtained in the operation 32 and/or the power capability information determined or obtained in the operation 34.

It should be noted that the operations 32 and 34 are provided by way of example only. One or more other operations may be included in a variant of the algorithm 30 and one or both of the operations 32 and 34 may be omitted.

Figure 4:
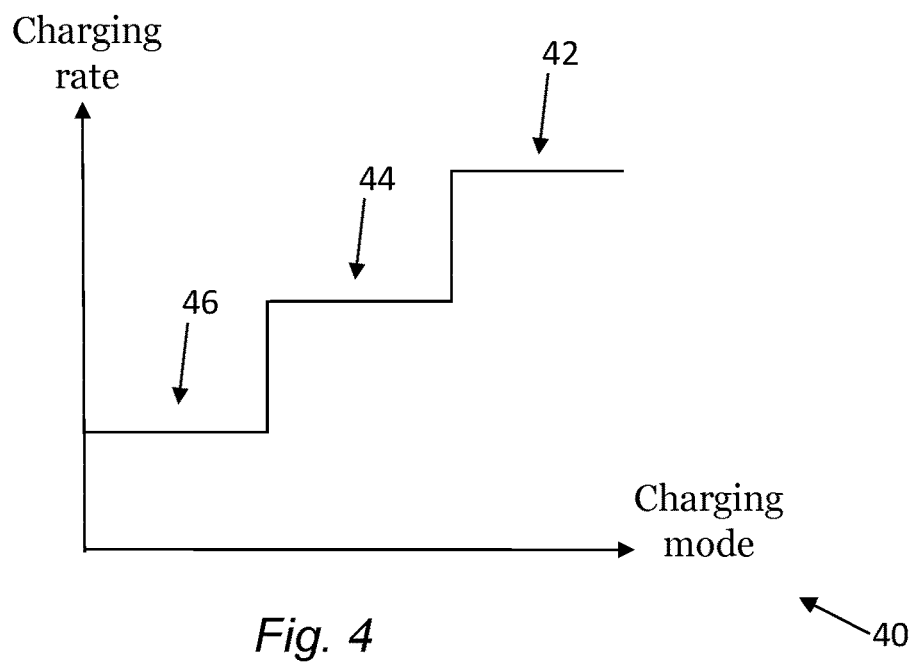
FIG. 4 is a plot demonstrating a use of an example embodiment.

FIG. 4 is a plot, indicated generally by the reference numeral 40, demonstrating a use of an example embodiment.

The plot 40 shows the charging rate in different charging modes. In a first charging mode, indicated generally by the reference numeral 42, the charging rate is relatively high (such that the battery 16 is charged at a first, relatively high, charging rate in the first charging mode). In a second charging mode, indicated generally by the reference numeral 44, the charging rate is lower than the charging rate in the first charging mode. Finally, in a third charging mode, indicated generally by the reference numeral 46, the charging rate is lower than the charging rate in either the first or second charging modes.

Thus, the plot 40 shows charging rates of three possible charging modes that could be set in the operation 22 or 36. Of course, the three charging rate are provided by way of example only; more or fewer charging rates could be provided in an embodiment of the invention (indeed, two charging modes are used in many example embodiments). Moreover, although the plot 40 shows discrete charging rate changes in different charging modes this is not essential to all example embodiments; a more gradual change may be implemented, as discussed further below.

Figure 5:
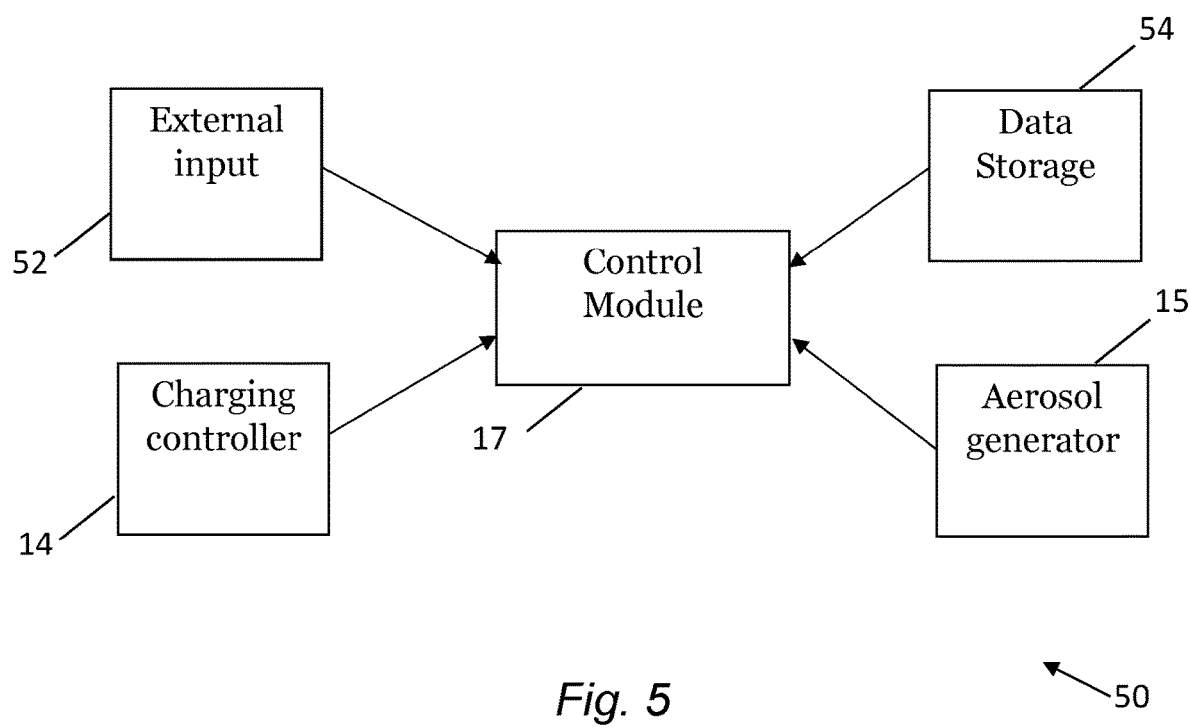
FIG. 5 is a block diagram of a system in accordance with an example embodiment.

FIG. 5 is a block diagram of a system, indicated generally by the reference numeral 50, in accordance with an example embodiment. The system 50 shows the charging controller 14, the aerosol generator 15, the control module 17, an external input 52 and data storage 54.

The control module 17 may set the charging mode based on a variety of inputs, such as some or all of the inputs shown in the system 50, as discussed further below. Note that, in some embodiments, the functionality of the control module 17 is implemented by the charging controller 14, such that the charging controller 14 is in the center of the system 50.

The external input 52 may be used to provide input to an algorithm used by the control module 17 (or the charging controller 14) for setting the charging mode. For example, the external input 52 may provide information relating to the usage of the aerosol generating device 12 or 12' or the usage of the aerosol generator 15. As discussed below, the external input 52 may take the form of a user interface that enables a user of an aerosol generating device to provide information.

Similarly, the charging controller 14 may be used to provide input to an algorithm used by the control module 17 for setting the charging mode. For example, the charging controller may provide information relating to the usage of the aerosol generating device 12 or 12' or the usage of the aerosol generator 15 and/or the current charge level of the aerosol generator (e.g. the battery 16).

The data storage 54 may be used by the control module 17 in an implementation of the algorithms 20 and 30. For example, charging rate settings may be stored in the data storage 54. Also, information for converting usage information into a charging mode may be stored.

The aerosol generator 15 may provide information to the control module 17 that may be used in setting the charging mode. For example, the aerosol generator 15 may indicate whether or not the aerosol generator is currently in use. Alternatively, or in addition, the current level of charge of the aerosol generator (e.g. the battery 16) may be provided to the control module 17 by the aerosol generator 15 in addition to, or instead of, usage information of the aerosol generator.

It is not essential to all example embodiments that all of the elements of the system 50 are provided. As discussed above, the functionality of the control module 17 may, in fact, be provided by the charging controller 14. Further, there may be no communication between the aerosol generator 15 and the control module 17. Similarly, one or more of the external input 52 and the data storage 54 may be omitted if not required.

Figure 6:
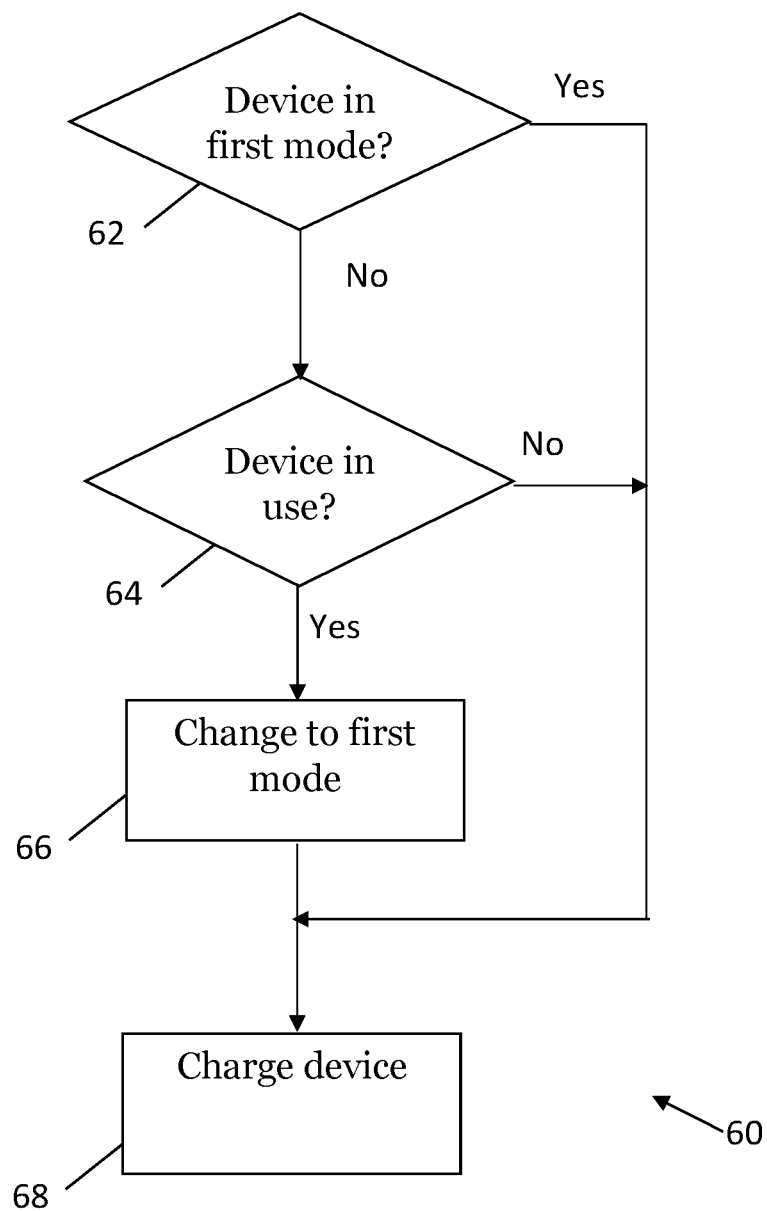
FIG. 6 is a flow chart showing an algorithm in accordance with an example embodiment.

FIG. 6 is a flow chart showing an algorithm, indicated generally by the reference numeral 60, in accordance with an example embodiment.

The algorithm 60 starts at operation 62, where a determination is made of whether the charging controller 14 of an aerosol generating device is operating in a first charging mode. As described above, a charging rate is set to a first charging rate in the first charging mode and a second charging rate, lower than the first charging rate, in the second charging mode (or any other charging mode).

If the device is operating in the first mode, the algorithm 60 moves to operation 68; otherwise the algorithm moves to operation 64 where a determination is made regarding whether the aerosol generating device is in use. If the device is determined to be in use, then the algorithm 60 moves to operation 66; otherwise the algorithm moves to operation 68.

At operation 66, the charging mode of the device (which device has been determined to be in use, but not operating in the first charging mode) is changed to the first charging mode. The algorithm them moves to operation 68.

In the operation 68, the aerosol generating device is charged in accordance with the set charging mode. Thus, when the aerosol generating device is in use, any charging of the battery is in the first mode.

It should be noted that the operation 68 may be set to charge the battery only in certain conditions (e.g. when a battery charge level is below a defined threshold). Indeed, the algorithm 60 may operate only in certain conditions (e.g. when the battery charge level is below said defined threshold).

Figures 7, 8, 9:
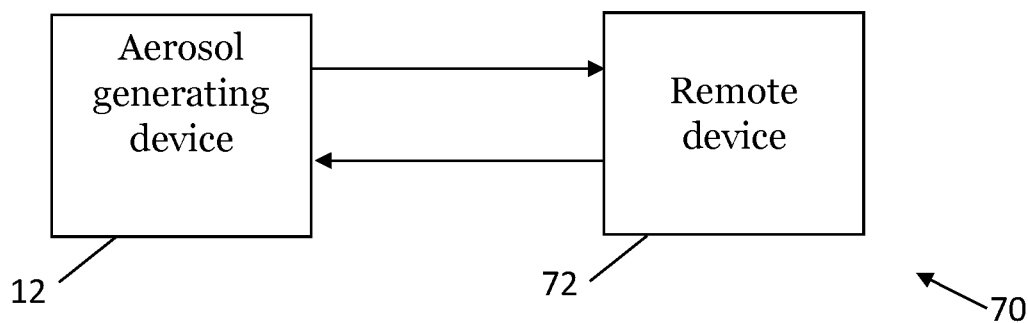
FIG. 7 is a block diagram of a system in accordance with an example embodiment.
FIGS. 8 and 9 show user interfaces in accordance with example embodiments.

FIG. 7 shows a system, indicated generally by the reference numeral 70, in accordance with an example embodiment. The system 70 comprises the aerosol generating device 12 (or the device 12') described above and a remote device 72, such as a mobile communication device, mobile phone, laptop, or some other mobile device etc.

As discussed further below, the aerosol generating device 12 or 12' has an output that transmits a signal (such as a Bluetooth signal). That signal can be detected by the remote device 72 such that the aerosol generating device can communicate with the remote device. Similarly, the remote device 72 is able to transmit to the aerosol generating device 12. It should be noted that although the configuration shown in FIG. 7 provides two-way communications between the aerosol generating device 12 and the remote device 72, the communication may be one-way (e.g. from the aerosol generating device to the remote device or vice-versa).

The system 70 may enable communications between the remote device 72 and the control module 17 and/or the charging controller 14. For example, the system 70 may enable data regarding the aerosol generating device 12 to be displayed to a user using the remote device 72 (which may have a better and/or more interactive display than the aerosol generating device itself). Similarly, the system 70 may enable the user to provide inputs to the aerosol generating device.

FIG. 8 shows a user interface, indicated generally by the reference numeral 80, in accordance with an example embodiment. The user interface 80 shows an example display in highly schematic form that shows data relating to the aerosol generating device (e.g. as a battery charge level in percentage and time remaining terms) and usage data of the device. Thus, the user interface enables, for example, the charging controller 14 or the control module 17 to provide information to a user of the aerosol generating device.

FIG. 9 shows a user interface, indicated generally by the reference numeral 80', in accordance with an example embodiment. The user interface 80' shows an example display in highly schematic form a data input form that enables a user to provide information (such as information relating to the usage of the aerosol generating device) to the charging controller 14 or the control module 17. Thus the user interface 80' enables a user to input usage information that may be used in the algorithm 30 described above.

In the example user interface 80', the user is able to indicate whether they are a "frequent user", a "moderate user" or an "infrequent user" of the aerosol generating device. (FIG. 9 shows the "moderate user" input selected.) The user defined usage level may be used in the setting of the charging mode.

Of course, the user interfaces 80 and 80' are provided by way of example only and are highly schematic. Many alternative display configuration could be provided, including displaying or providing other forms of data. For example, information such as one or more of battery capacity, maximum charging current or maximum charging voltage for a battery (such as the battery 16 described above) may be input via the user interface; this might be particularly useful, for example, if the battery was a replaceable battery (such that those details may change).

Figure 10:
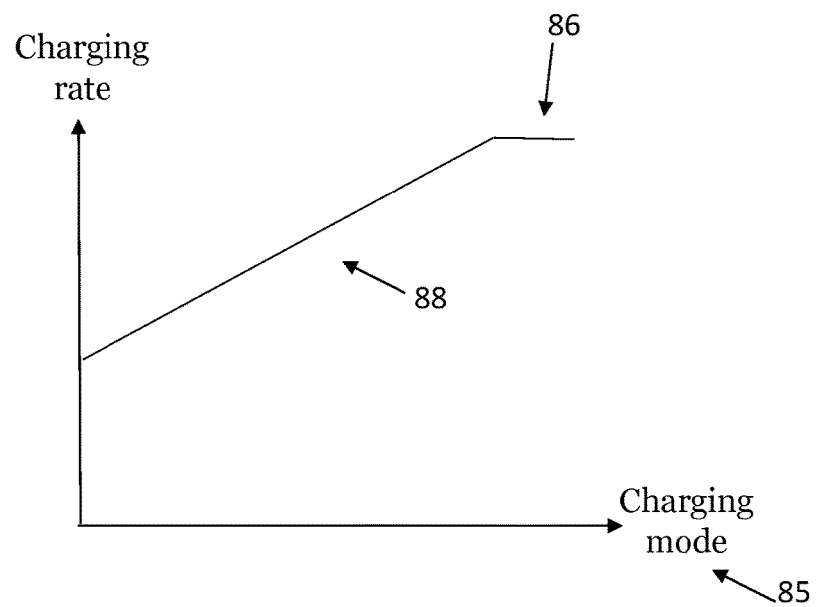
FIG. 10 is a plot demonstrating a use of an example embodiment.

FIG. 10 is a plot, indicated generally by the reference numeral 85, demonstrating a use of an example embodiment.

The plot 85 shows the charging rate changing as the charging mode changes. In a first charging mode, indicated generally by the reference numeral 86, the charging rate is relatively high (such that the battery 16 is charged at a first, relatively high, charging rate in the first charging mode). In other charging modes, indicated generally by the reference numeral 88, the charging rate is lower than the charging rate in the first charging mode. However, in the other charging modes 88, the charging rate varies smoothly, rather than in steps as discussed above with reference to the plot 40.

Thus, the plot 85 shows charging rates of two possible charging modes that could be set in the operation 22 or 36, wherein the charging rate is variable in the second charging mode.

Figure 11:
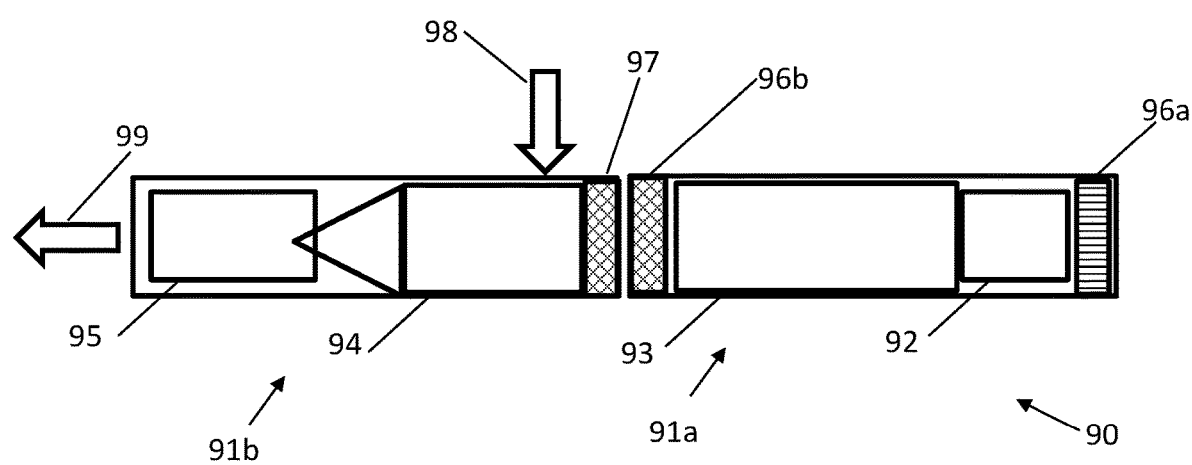
FIG. 11 is a block diagram of an aerosol provision device in accordance with an example embodiment.

FIG. 11 is a block diagram of an aerosol provision device, indicated generally by the reference numeral 90, in accordance with an example embodiment.

The aerosol provision device 90 is an example implementation of the aerosol generating device 12 or 12' described above. The device 90 is a modular device, comprising a first part 91a and a second part 91b.

The first part 91a of the device 90 includes a control circuit 92 (which may include the charging controller 14 and the control module 17 of the device 12) and a battery 93 (such as the battery 16 described above). The second part 91b of the device 90 includes a heater 94 and a liquid reservoir 95 (that may collectively form of the aerosol generator 15 of the system 10 described above).

The first part 91a includes a first connector 96a (such as a USB connector). The first connector 96a may enable connection to be made to a power source (such as the power source 18 described above) for charging the battery 93, for example under the control of the control circuit 92 (e.g. under the control of the charging controller 14).

The first part 91a also includes a second connector 96b that can be removably connected to a first connector 97 of the second part 91b.

In the use of the device 90, air is drawn into an air inlet of the heater 94, as indicated by the arrow 98. The heater is used to heat the air (e.g. under the control of the circuit 93). The heated air is directed to the liquid reservoir 95, where an aerosol is generated. The aerosol exits the device at an air outlet, as indicated by the arrow 99 (for example into the mouth of a user of the device 90).

Figure 12:
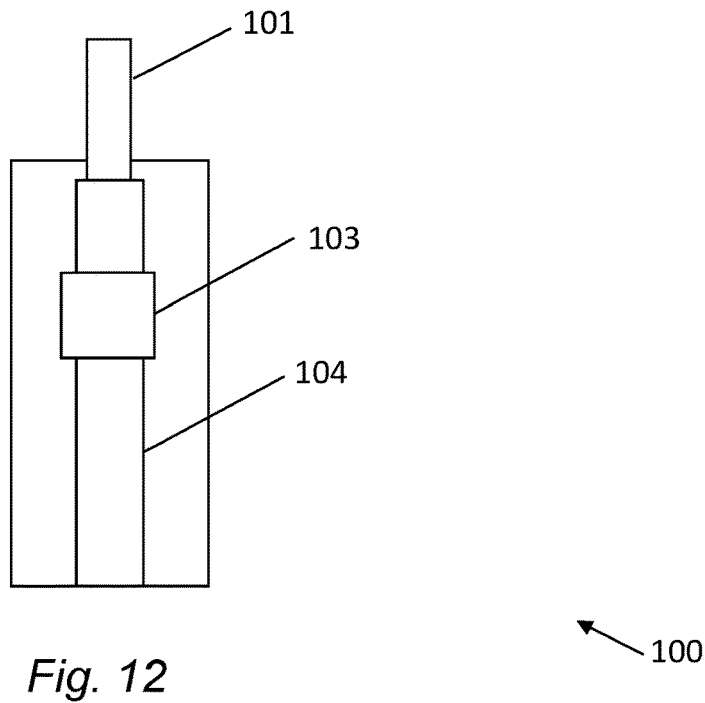
FIG. 12 is a block diagram of an aerosol provision device in accordance with an example embodiment.

FIG. 12 is a block diagram of an aerosol provision device, indicated generally by the reference numeral 100, in accordance with an example embodiment. The aerosol provision device 100 is an alternative example implementation of the aerosol generating device 12 or 12' described above and may also include other elements of the system 10.

FIG. 12 is a perspective view of the aerosol provision device 100 without an outer cover. The aerosol provision device 100 may comprise a replaceable article 101 that may be inserted in the aerosol provision device 100 to enable heating of the article 101. The aerosol provision device 100 further comprises one or more heating elements 103 and one or more air tube extenders 104.

The heating elements 103 may be heaters that directly heat the article 101. Alternatively, the heating elements 103 may be inductive heating elements that are configured to interact with a susceptor comprised within the article 101 (or provided elsewhere).

The two alternative aerosol provision devices 90 and 100 are provided by way of example only; many further variants and alternatives are possible.

Figure 13:
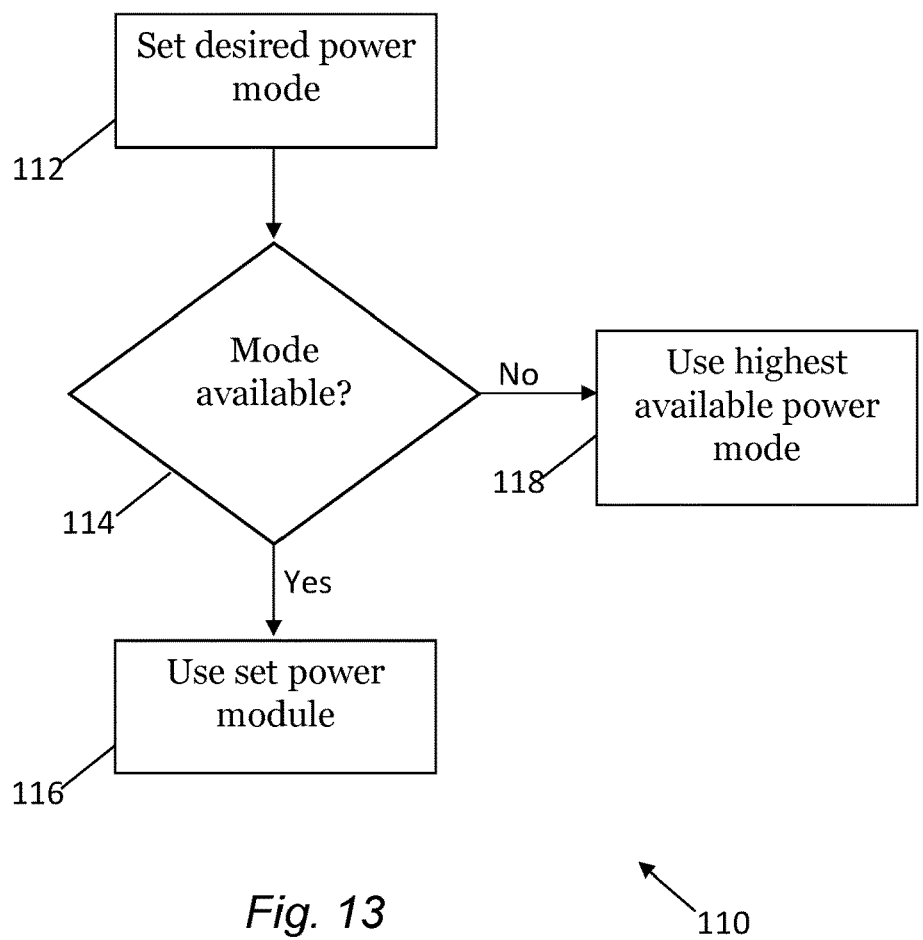
FIGS. 13 and 14 are flow charts showing algorithms in accordance with example embodiments.

FIG. 13 is a flow chart, indicated generally by the reference numeral 110, showing an algorithm in accordance with an example embodiment.

The algorithm 110 starts at operation 112, where a desired power or charging mode is set (for example by the control module 17 or the charging controller 14). The charging mode may be set based on information such as the current charge level of the battery and/or a usage profile of the aerosol generating device (e.g. recent usage and/or anticipated future usage). Other data may also be used, for example time of day and the charging profile of the user of the aerosol generating device.

At operation 114, a determination is made regarding whether the desired power or charging mode is available. Whether or not the charging mode is available may, for example, be based on the outputs of the algorithm 120 described below.

If the desired charging mode is available, then the algorithm moves to operation 116, where that charging mode is used. Alternatively, if the desired charging mode is unavailable (e.g. due to the power supply capabilities), then the algorithm moves to operation 118, where the highest available power mode is used.

Figure 14:
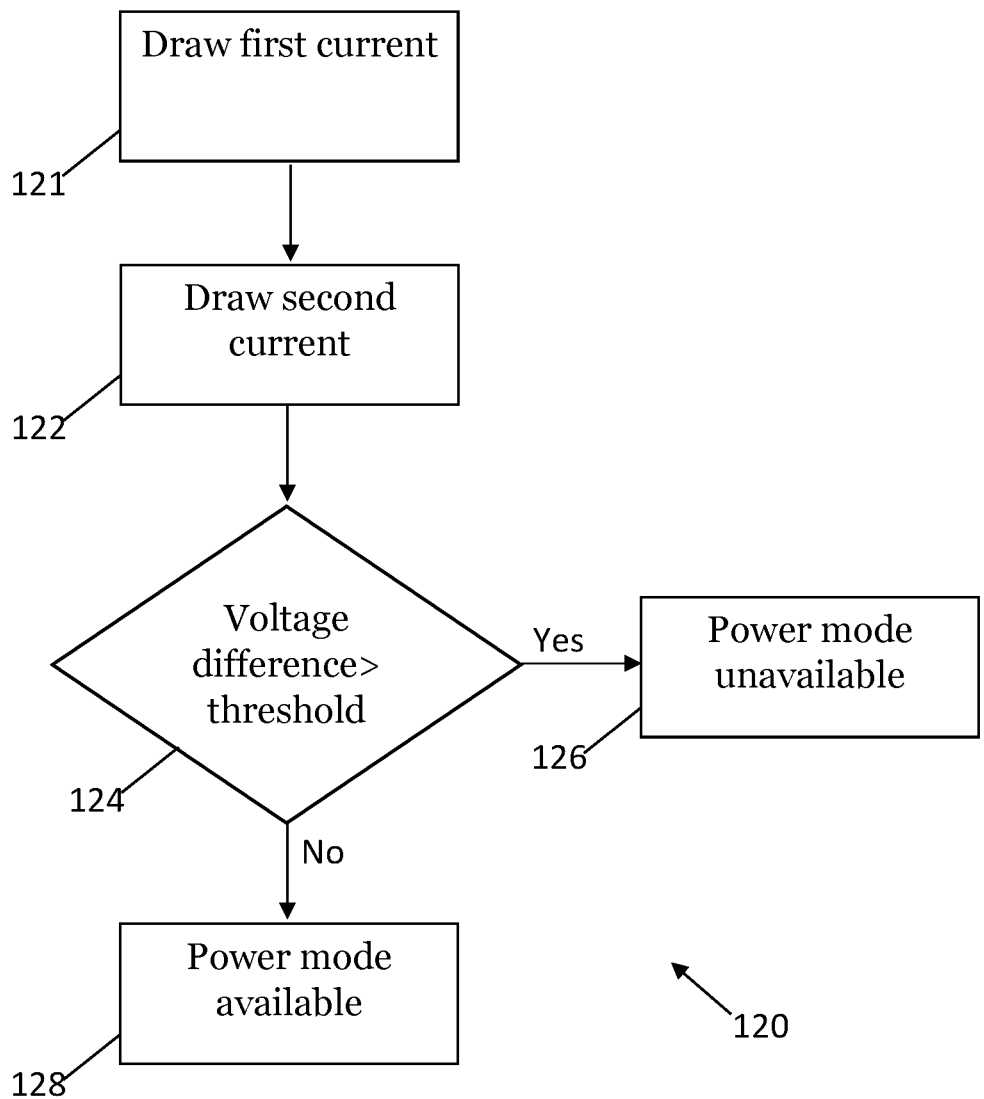

FIG. 14 is a flow chart, indicated generally by the reference numeral 120, showing an algorithm in accordance with an example embodiment.

The algorithm 120 may be implemented by the charging controller 14, the control module, the external input 42 or elsewhere. Further, the algorithm 120 may be distributed; for example, some steps may be implemented by the charging controller 14 with other steps being implemented by the control module 17.

The algorithm 120 starts at operation 121, where a first current is drawn from the power source 18 (e.g. a power supply). The voltage at which that first current is provided by the power source may be determined or detected (and may, for example, be stored in the data storage 44).

At operation 122, the current demand is changed (typically increased) such that a second current is drawn from the power source 18. The voltage at which the second current is provided by the power source may be determined or detected (and may, for example, be stored in the data storage 44).

At operation 124, the difference between the voltage at which the first and second current are provided is determined and, if that voltage change is above a threshold, the algorithm 120 moves to operation 126; otherwise, the algorithm 120 moves to operation 128.

At operation 126, the fact that the voltage difference is above the relevant threshold is used to determine that the power capabilities of the power source are insufficient to provide the power mode associated with the higher current (typically the second current). Accordingly, that power mode is set to be unavailable.

At operation 128, the fact that the voltage difference is below the relevant threshold is used to determine that the power capabilities of the power source are sufficient to provide the power mode associated with the higher current (typically the second current). Accordingly, that power mode is set to be available.

The settings as determined in the operations 126 and 128 may be stored in an internal register indicative of power capabilities (e.g. which of the power modes are available for selection). That register may, for example, form part of the data storage 44 described above.

The algorithm 120 may be part of a one-off test procedure or a periodic test procedure such that a determination of power capabilities is performed in order to determine which of a plurality of power modes are available for charging the battery of the aerosol generator. Alternatively, or in addition, the algorithm 120 may be ongoing. For example, the algorithm 120 may be carried out during charging, such that power capabilities of the power source are determined during charging.

Many variants to the embodiments described above are possible.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilized and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

The invention claimed is:

1. An apparatus for an aerosol generating device, the apparatus comprising:
   a control module; and
   a charging controller,
   wherein:
      the charging controller is configured to control charging of a battery at a first charging rate in a first charging mode and to control charging of the battery at a second charging rate, lower than the first charging rate, in a second charging mode,
      the control module is configured to determine whether the aerosol generating device is in use, and
      the charging controller, when operating in the second charging mode, is configured to change to the first charging mode if the control module determines that the aerosol generating device is in use.

2. The apparatus as claimed in claim 1, further comprising the battery.

3. The apparatus as claimed in claim 1, further comprising an aerosol generator.

4. The apparatus as claimed in claim 1, further comprising a user interface.

5. The apparatus as claimed in claim 1, wherein the control module forms part of the charging controller.

6. The apparatus as claimed in claim 1, wherein the control module is configured to determine information relating to usage of the aerosol generating device, and the charging controller is configured to operate in a charging mode dependent, at least in part, on the usage of the aerosol generating device.

7. The apparatus as claimed in claim 1, wherein the charging controller is configured to control charging of the battery using a power supply at a charging current dependent, at least in part, on power capabilities of the power supply.

8. The apparatus as claimed in claim 1, wherein the charging controller is configured to operate in a charging mode dependent, at least in part, on a charge level of the aerosol generating device.

9. The apparatus as claimed in claim 1, wherein the charging controller is configured to disable charging of the battery if a charge level of the battery is above a battery charge threshold.

10. A non-combustible aerosol generating device comprising the apparatus as claimed in claim 1.

11. The non-combustible aerosol generating device as claimed in claim 10, wherein the aerosol generating device is configured to receive a removable article comprising an aerosol generating material.

12. The non-combustible aerosol generating device as claimed in claim 11, wherein the aerosol generating material comprises an aerosol generating substrate and an aerosol forming material.

13. The non-combustible aerosol generating device as claimed in claim 10, wherein the apparatus comprises a tobacco heating system.

14. A kit of parts comprising an article for use in a non-combustible aerosol generating system, wherein the non-combustible aerosol generating system comprises the apparatus as claimed in claim 1.

15. The kit of parts as claimed in claim 14, wherein the article is a removable article comprising an aerosol generating material.

16. A method comprising:
   determining whether a charging controller of an aerosol generating device is operating in a first charging mode or a second charging mode, wherein a charging rate is set to a first charging rate in the first charging mode and to a second charging rate, lower than the first charging rate, in the second charging mode;
   determining whether the aerosol generating device is in use; and
   changing from the second charging mode to the first charging mode if the charging controller is determined to be operating in the second charging mode and the aerosol generating device is determined to be in use.

17. The method as claimed in claim 16, further comprising charging the battery.

18. The method as claimed in claim 16, further comprising obtaining or determining information relating to usage of the aerosol generating device, and selecting a charging mode dependent, at least in part, on the usage of the aerosol generating device.

19. The method as claimed in claim 16, further comprising selecting a charging mode dependent, at least in part, on power capabilities of a power supply used for charging the battery.

20. The method as claimed in claim 16, further comprising obtaining or determining information relating to a charge level of the aerosol generating device, and selecting a charging mode dependent, at least in part, on the charge level of the aerosol generating device.

21. The method as claimed in claim 16, further comprising disabling charging of the battery if a charge level of the battery is above a battery charge threshold.

* * * * *